(12) United States Patent
Holschlag

(10) Patent No.: US 7,845,129 B2
(45) Date of Patent: Dec. 7, 2010

(54) SUPPORT FOR A GRAIN BIN FLOOR

(75) Inventor: Joseph C. Holschlag, New Hampton, IA (US)

(73) Assignee: Sukup Manufacturing Company, Sheffield, IA (US)

( * ) Notice: Subject to any disclaimer, the term of this patent is extended or adjusted under 35 U.S.C. 154(b) by 57 days.

(21) Appl. No.: 11/428,603

(22) Filed: Jul. 5, 2006

(65) Prior Publication Data

US 2008/0006000 A1    Jan. 10, 2008

(51) Int. Cl.
- *E04B 1/70* (2006.01)
- *E04B 5/00* (2006.01)
- *E04H 7/22* (2006.01)

(52) U.S. Cl. .......... 52/263; 52/192; 52/302.2; 52/636; 454/182

(58) Field of Classification Search .......... 52/145, 52/192, 263, 696, 302.2, 730.6, 731.7, 690, 52/729.2, 729.5, 731.8, 836, 197, 635, 636; 454/182

See application file for complete search history.

(56) References Cited

U.S. PATENT DOCUMENTS

| | | | | |
|---|---|---|---|---|
| 1,604,151 A * | 10/1926 | Dornier | .......... | 52/731.6 |
| 2,047,990 A * | 7/1936 | Carswell et al. | .......... | 256/13.1 |
| 3,272,480 A * | 9/1966 | Sukup | .......... | 366/261 |
| 3,283,459 A * | 11/1966 | Beranek et al. | .......... | 52/263 |
| 3,426,445 A * | 2/1969 | Steffen | .......... | 34/233 |
| 4,137,682 A * | 2/1979 | Trumper | .......... | 52/302.3 |
| 4,281,489 A * | 8/1981 | Kallestad et al. | .......... | 52/192 |
| 4,282,694 A * | 8/1981 | Mead | .......... | 52/508 |
| RE31,368 E * | 9/1983 | Trumper | .......... | 52/302.2 |
| 4,557,086 A * | 12/1985 | Liefer et al. | .......... | 52/194 |
| 4,604,842 A * | 8/1986 | Sukup | .......... | 52/263 |
| 4,619,085 A * | 10/1986 | Carroll et al. | .......... | 52/192 |
| RE33,358 E * | 10/1990 | Sukup | .......... | 52/263 |
| 5,107,644 A | 4/1992 | Hanig et al. | | |
| 5,417,028 A * | 5/1995 | Meyer | .......... | 52/846 |
| 6,026,932 A * | 2/2000 | Comp | .......... | 182/150 |
| 7,487,621 B2 * | 2/2009 | Grossman et al. | .......... | 52/302.2 |
| 2006/0090413 A1 * | 5/2006 | Grossman et al. | .......... | 52/263 |

OTHER PUBLICATIONS

L & J Industries, Inc. Letter to Grain Dealers with Attachments, Dec. 1997.
Sukup Manufacturing Compnay, "Bin Floors".
L & J Industries, Inc., FREE-FLOW Heavy Duty Grain Bin Floor Supports.

* cited by examiner

Primary Examiner—Robert J Canfield

(57) ABSTRACT

A floor support for a grain bin floor made from a sheet of galvanized steel. The support having an upper flange or rail that extends upwardly from an upper shelf and is interposed between notches. A plurality of columns that extend downwardly from the upper shelf to a base to provide added stability to the support. A bend in the support which allows the support to stand upright without the need for additional supports.

7 Claims, 6 Drawing Sheets

SUPPORT FOR A GRAIN BIN FLOOR

BACKGROUND OF THE INVENTION

This invention is directed toward a support for a grain bin floor and more particularly to a support that is easier to manufacture.

Floors which are used in grain storage bins are often-times elevated and supported above a base of the bin thereby creating a plenum between the base and the supported floor. The supported floor has perforations through it so that air which may be heated or ambient can be passed from outside the bin in to the plenum and up through the perforations in the floor for passage through overlying grain. The air may be used to dry, cool or otherwise condition overlying grain in the bin, e.g. to prevent subsequent spoilage of the grain. Such bins may serve as drying bins for continuous or batch drying and/or for longer term storage.

Supported bin floors generally include a plurality of longitudinal panels cut to appropriate lengths and arranged side-by-side to substantially cover the entire floor area of the bin.

Grain bin floor supports are known in the art. One such example is a Z-Post support manufactured by Sukup Manufacturing Company which has a Z-shape, a diagonal portion that provides additional support across the center of the floor plank, and notched sides that provide a self-tightening spring action lock. These supports require the use of specially designed bin floors.

Another floor support, also manufactured by Sukup Manufacturing Company is the Sukup Super Supports™. This design has a welded rod frame that allows air to flow freely throughout the bin plenum area. This open design provides better heat distribution, which makes for more efficient drying. The angle of the iron base provides stability. Also, the support is fast and easy to install and may be used with many bin floors. This design is more costly and difficult to manufacture. Therefore, there exists a need in the art for a floor support that addresses these problems.

An objective of the invention is to provide a floor support that is easy to manufacture without wire welding.

Another objective of the present invention is to provide a floor support that is more economical to manufacture.

These and other objectives will be apparent to those skilled in the art from the following description, drawing and claims.

BRIEF SUMMARY OF THE INVENTION

A floor support for a grain bin floor made from a sheet of steel. The support having an upper flange or rail that extends upwardly from an upper shelf and is interposed between notches. A plurality of columns that extend downwardly from the upper shelf to a base to provide added stability to the support. A bend in the support which allows the support to stand upright without the need for additional supports.

DETAILED DESCRIPTION OF THE PREFERRED EMBODIMENT

Figure 1:
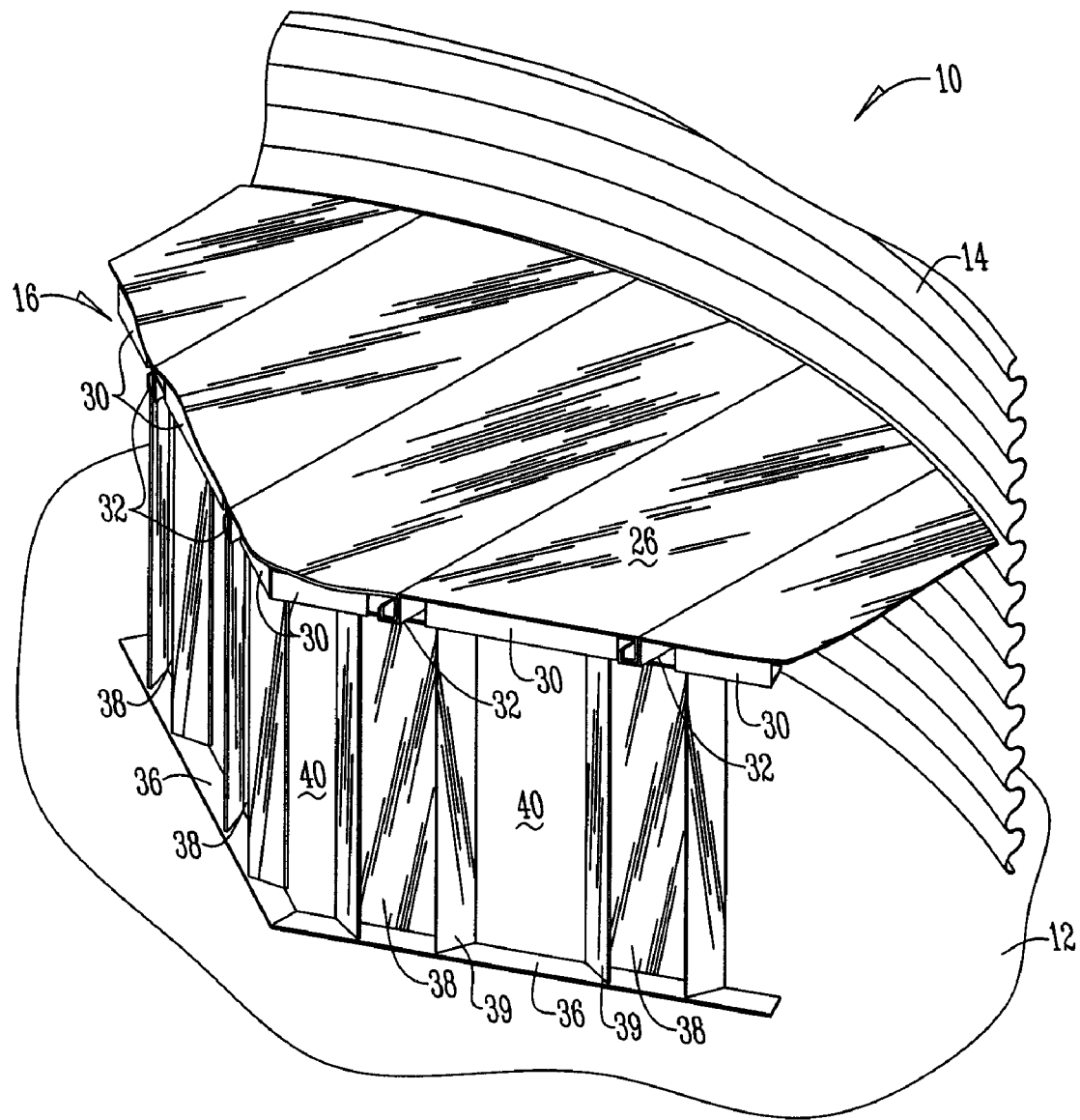
FIG. 1 is a perspective view of a supported floor system.
Figure 2:
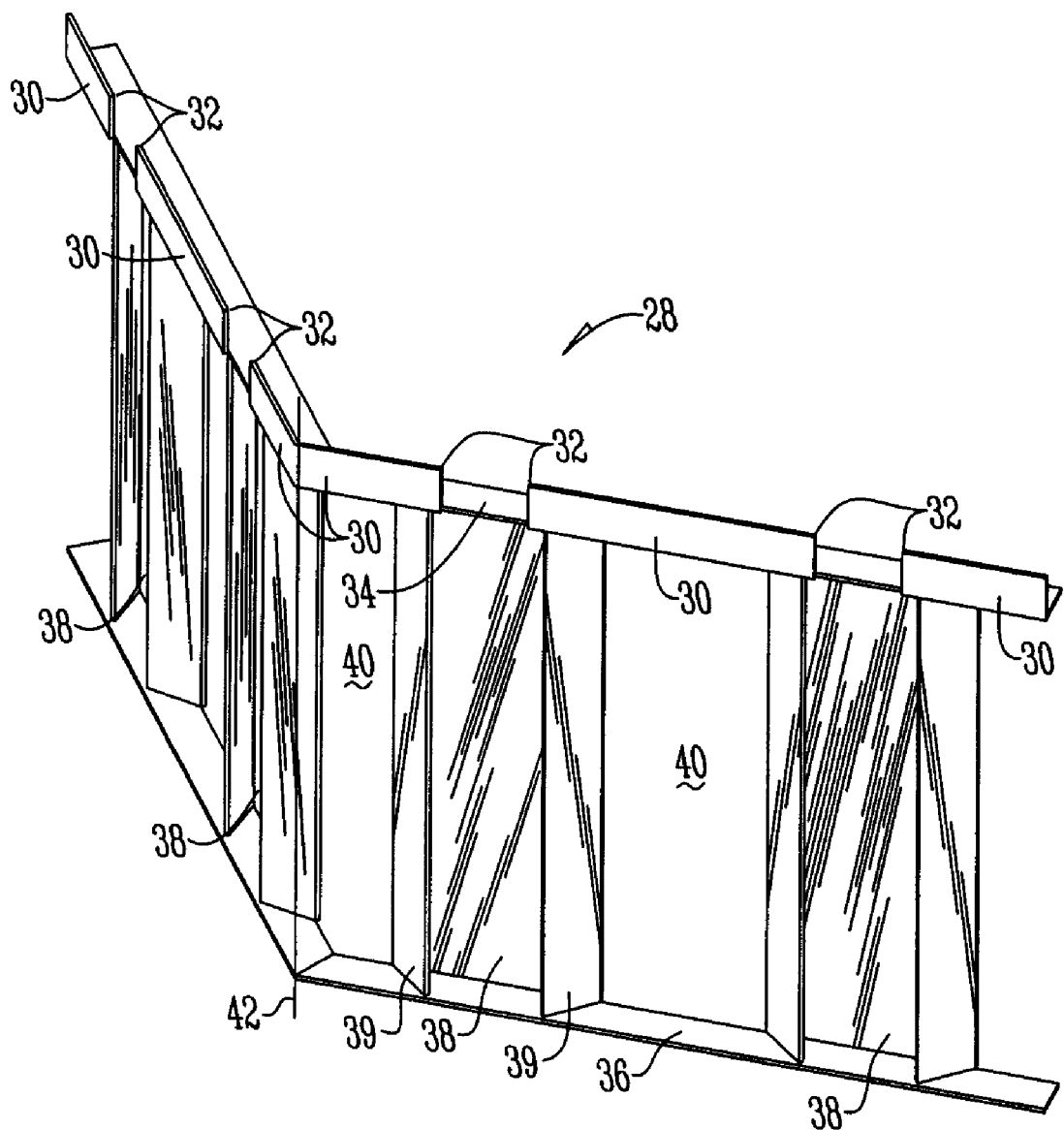
FIG. 2 is a perspective side view of a floor support.
Figure 3:
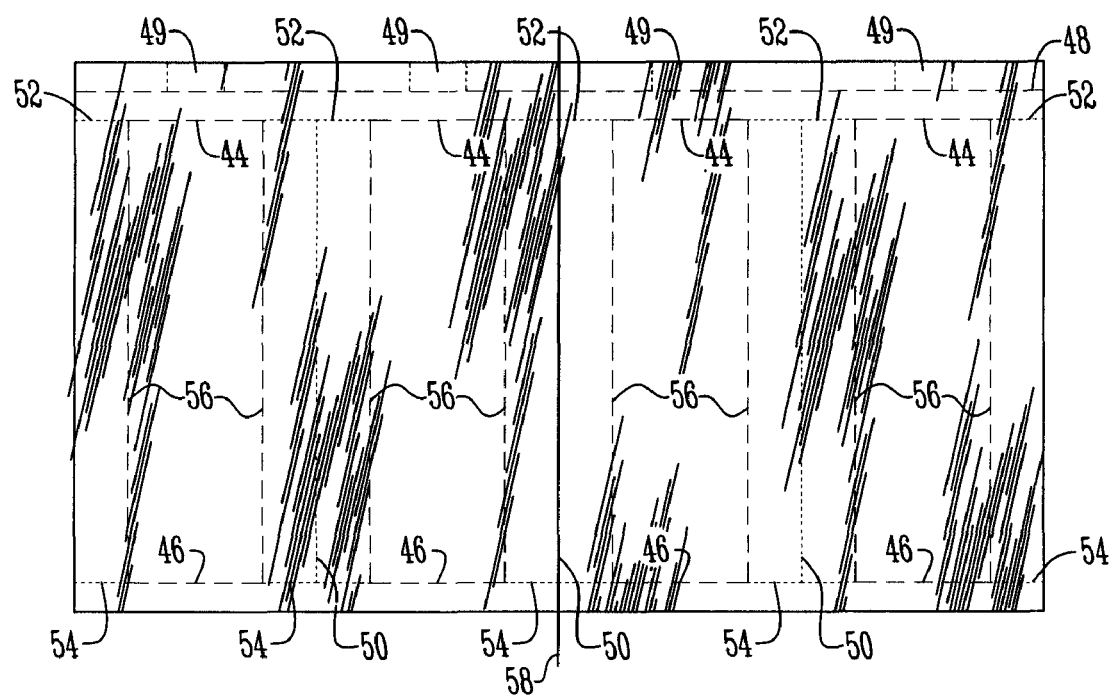
FIG. 3 is a plan view of a sheet of galvanized steel.
Figure 3A:
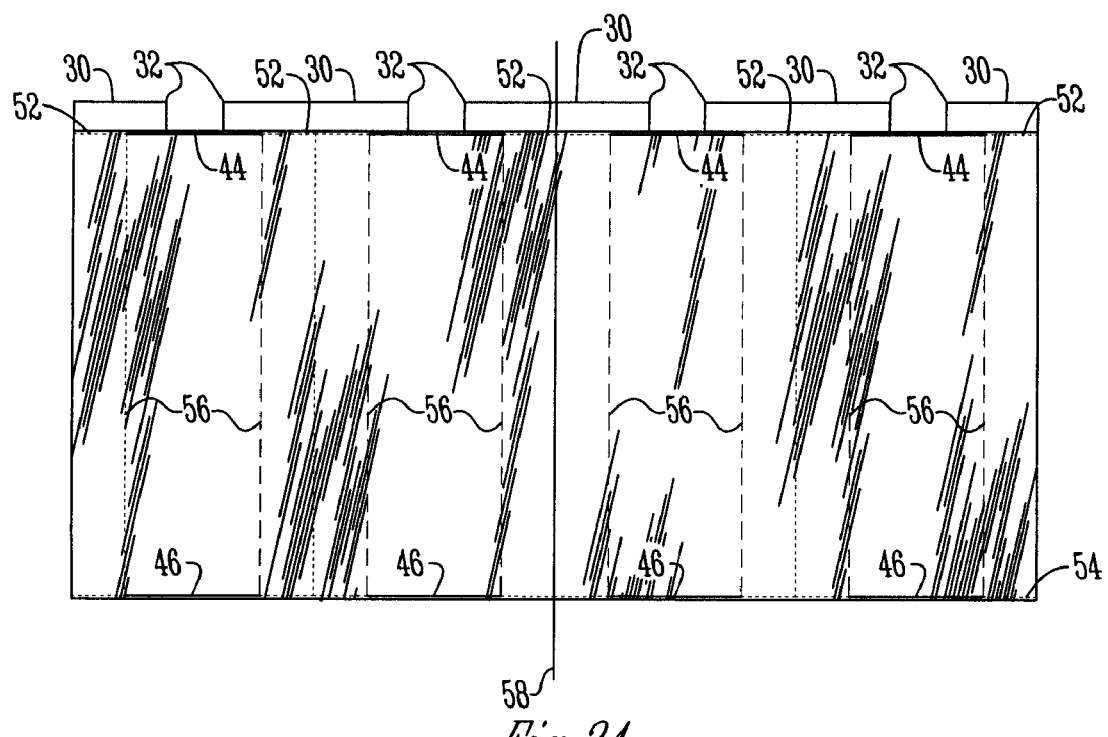
FIG. 3A is a plan view of a floor support during assembly.
Figure 3B:
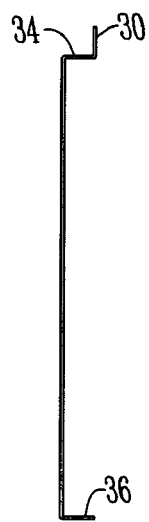
FIG. 3B is an end view of a floor support during assembly.
Figure 4:
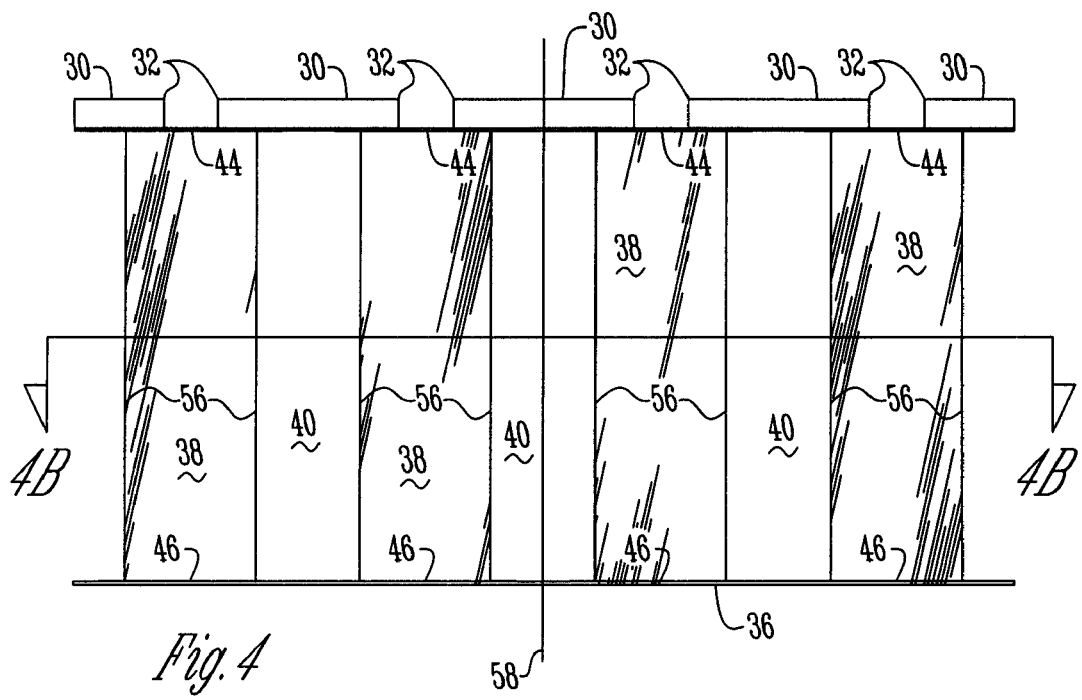
FIG. 4 is a plan view of a floor support during assembly.
Figure 4A:
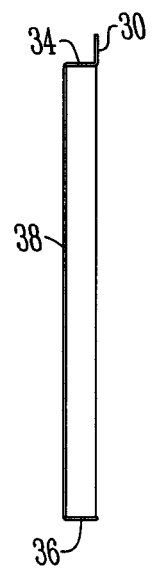
FIG. 4A is an end view of a floor support during assembly.
Figure 4B:
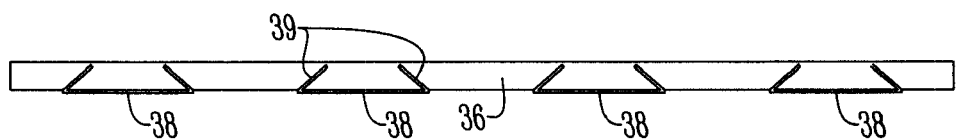
FIG. 4B is a top sectional view of a floor support during assembly.
Figure 5:
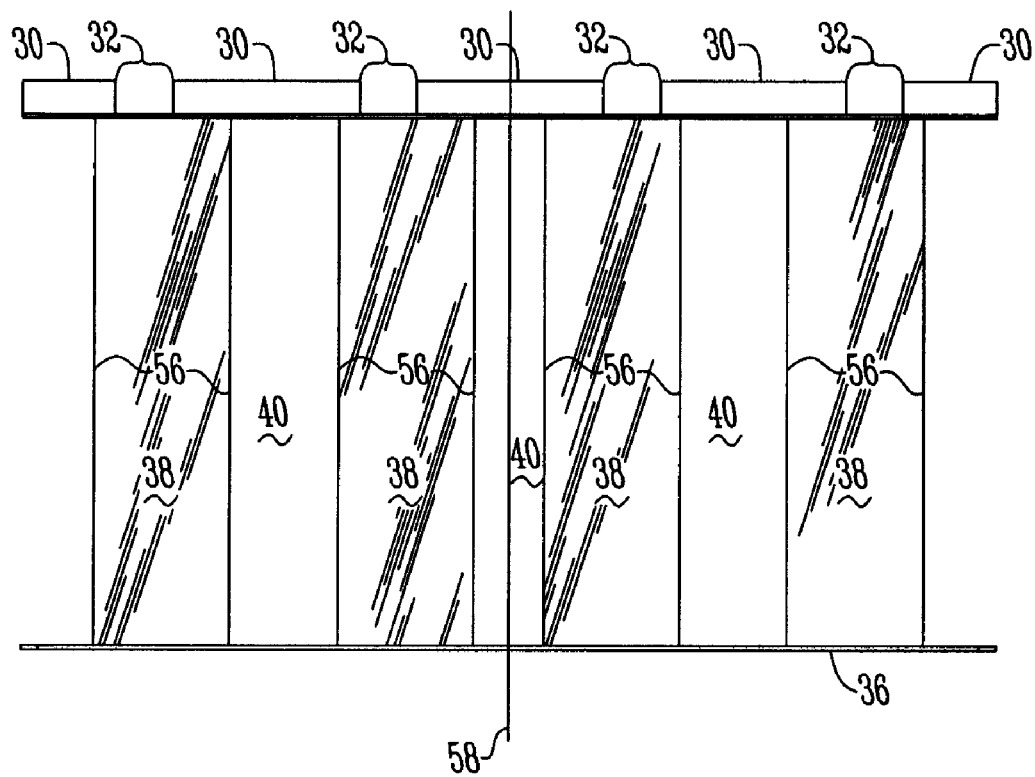
FIG. 5 is a plan view of a floor support during assembly.
Figure 5A:
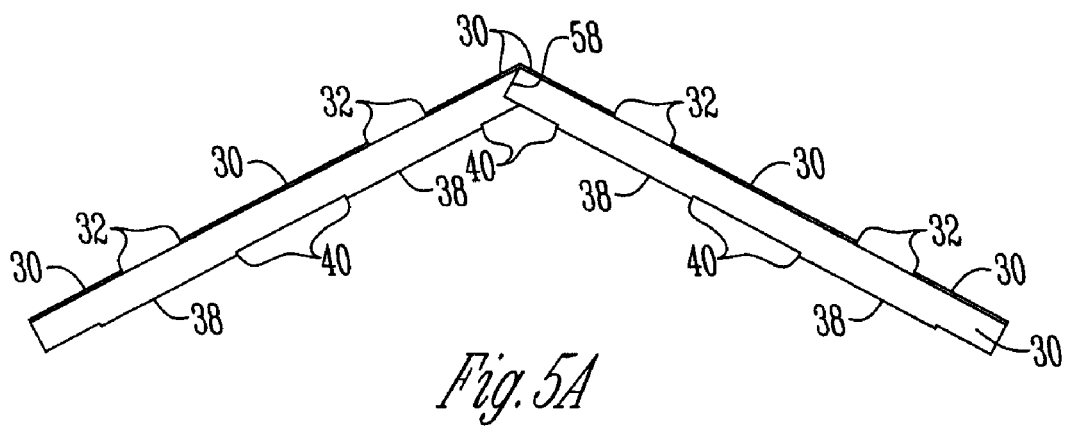
FIG. 5A is a top plan view of a floor support.

FIG. 1 illustrates a partial perspective view of a grain bin 10 having a concrete pad or foundation 12 and a circular wall 14, typically formed of corrugated sheet metal, with the supported grain bin floor system 16. The supported floor system 16 has floor panels which have perforations to provide for the passage of conditioning air, e.g., drying and/or cooling air. This air is conveyed into the bin by a fan (not shown), which may include a heater (not shown) located outside the bin, and enters the bin through an opening. The air passes into the plenum below the panels 26 and up through the perforations into and through the grain (not shown) stored in the bin on the supported floor system 16. The floor panels 26 are supported by a plurality of floor supports 28. The floor support 28 is made from a single sheet of galvanized steel that is cut and bent to create a stable support for the floor panels 26. The floor support has a plurality of upper flanges or rails 30 that are interposed by upper notches 32, the rails extending upwardly from an upper shelf 34. The upper rails 30 provide support across the center of the floor plank 26 while the notches 32 receive the outer edges of the floor plank 26 which are supported by the upper shelf 34.

Extending downwardly from the upper shelf 34 to a base 36 are a plurality of columns 38 having support wings 39. The columns are of any shape but a three sided triangular shape is preferred and provides support extending from the upper shelf 34 to the base 36 when loads are received on the panels 26 of the floor system 16. Interposed between the columns 38 are openings 40 which allow for air flow. The floor support has at least one bend 42 which is generally vertical when the floor support 28 is in an upright position. The bend 42 permits the floor support 28 to remain in an upright position without additional supports which prevents the floor support 28 from falling during assembly or usage. The bend 42 is of any angle which will provide upright stability to the floor support.

To form the floor support 28 a sheet of galvanized steel is bent along fold 44 and fold 46 to form the upper shelf 34 and the base 36. The sheet is also bent along fold 48 to form a flange that extends generally vertically from the upper shelf 34. Sections 49 are cut from the flange to form the notches 32 and in turn the upper rails 30.

Vertical cuts 50 are made that extend between the upper shelf 34 and the base 36 and horizontal cuts 52 and 54 are made in alignment with the upper shelf 34 and the base 36 respectively. The horizontal cuts 52 and 54 extend from the vertical cut 50 to the fold 56. Once cut the sheet is bent along fold 56 such that a hollow column 38 is formed that extends between the upper shelf 34 and the base 36. The top and bottom edges of wings 39 where the horizontal cuts 52 and 54 were made to form hollow column 38 may be welded to the upper shelf 34 and base 36 respectively to provide added stability. Finally, a notch is made in the base 36 and the sheet is bent along fold 58 to form bend 42. The upper shelf 34 and base 36 may be welded at bend 42 to provide added stability.

Accordingly, a floor support has been shown that is easy and economical to manufacture that may be used with a variety of floor panels and at least all the stated objectives have been satisfied.

What is claimed is:

1. A support for a grain bin floor, comprising
a plurality of flanges interposed between a plurality of notches, the flanges extending upwardly from a shelf;
a plurality of columns that extend between the shelf and a base, wherein the columns have support wings forming the shape of a three sided triangle; and
a notch in the base that permits the support to bend and to remain in an upright position without the use of additional supports.

2. The support of claim 1 wherein the columns support the shelf.

3. The support of claim 1 wherein the columns comprise a sheet of galvanized steel subjected to vertical and horizontal cuts and bent along a fold.

4. The support of claim 1 wherein the shelf and flanges are formed from a sheet of galvanized steel by bending the steel along folds and cutting the notches out of the steel.

5. The support of claim 1 wherein the three sided triangle has an open apex.

6. The support of claim 1 wherein the support wings are positioned between the shelf and the base.

7. A support for a grain bin floor, comprising
a plurality of flanges interposed between a plurality of notches,
the flanges extending upwardly from a shelf;
a plurality of columns that extend between the shelf and a base, wherein the columns have support wings forming the shape of a three sided triangle; and
wherein a top edge of the support wings supports the shelf.

* * * * *